United States Patent
Hadad et al.

(10) Patent No.: US 10,127,081 B2
(45) Date of Patent: Nov. 13, 2018

(54) EFFICIENT RESOURCE MANAGEMENT IN A VIRTUALIZED COMPUTING ENVIRONMENT

(75) Inventors: Erez Hadad, Nahariya (IL); Yosef Moatti, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1747 days.

(21) Appl. No.: 13/598,634

(22) Filed: Aug. 30, 2012

(65) Prior Publication Data

US 2014/0068077 A1    Mar. 6, 2014

(51) Int. Cl.
G06F 15/16    (2006.01)
G06F 9/50    (2006.01)

(52) U.S. Cl.
CPC ............ *G06F 9/5027* (2013.01); *G06F 9/505* (2013.01)

(58) Field of Classification Search
CPC ......... G06F 2009/4557; G06F 9/45558; G06F 9/5066; G06F 9/5077; G06F 9/5011; G06F 3/126; G06Q 10/04; G06Q 10/06; H04L 47/76; H04L 47/781
See application file for complete search history.

(56) References Cited

U.S. PATENT DOCUMENTS

| | | | | |
|---|---|---|---|---|
| 5,442,791 A * | 8/1995 | Wrabetz | ................ | G06F 9/5072 709/202 |
| 6,493,697 B1 * | 12/2002 | Stier | ...................... | G06N 5/025 706/50 |
| 7,555,546 B1 * | 6/2009 | Anumala | ................ | H04L 45/00 370/241 |
| 8,533,711 B2 * | 9/2013 | Heim | ................... | G06F 9/45558 718/1 |
| 9,503,517 B1 * | 11/2016 | Brooker | .............. | H04L 67/1008 |
| 9,563,480 B2 * | 2/2017 | Messerli | ............... | G06F 9/5072 |
| 2008/0295096 A1 | 11/2008 | Beaty et al. | | |
| 2010/0269109 A1 * | 10/2010 | Cartales | ................ | G06F 9/5072 718/1 |
| 2010/0274920 A1 * | 10/2010 | Kunii | .................... | H04L 1/0002 709/233 |

(Continued)

OTHER PUBLICATIONS

Shields, G., "Virtual server cluster size: What's the magic number?" SearchServerVirtualization.com, TechTarget, May 11, 2011, 1 page, Copyright 2006-2015. http://searchservervirtualization.techtarget.com/tip/Virtual-server-cluster-size-Whats-the-magic-number.

*Primary Examiner* — Sm Rahman
*Assistant Examiner* — Ranjan Pant
(74) *Attorney, Agent, or Firm* — Peter J. Edwards

(57) ABSTRACT

Systems and methods for allocating resources to service one or more requests, the method comprising: associating with at least one host from among N hosts, in a computing environment, a first value that reflects a probability that servicing a first request will interfere with operations on the host; selecting M hosts out of the N hosts, wherein the N hosts comprise one or more resources for servicing a first request and wherein at least one of the selected M hosts is determined to be at least as suitable as N–M unselected hosts, for the purpose of servicing the first request; and prior to allocation of resources, updating for at least a first host from among the M hosts the corresponding first value to reflect that servicing the first request may interfere with operations pertaining to other previously received requests that are scheduled to be serviced by the first host.

18 Claims, 5 Drawing Sheets

(56) References Cited

U.S. PATENT DOCUMENTS

| | | | |
|---|---|---|---|
| 2011/0029672 A1* | 2/2011 | Agneeswaran | G06F 9/5044 |
| | | | 709/226 |
| 2011/0099204 A1* | 4/2011 | Thaler | G06F 9/5038 |
| | | | 707/797 |
| 2011/0302578 A1 | 12/2011 | Isci et al. | |
| 2012/0185553 A1* | 7/2012 | Nelson | H04L 67/10 |
| | | | 709/209 |
| 2013/0061238 A1* | 3/2013 | Archer | G06F 9/5044 |
| | | | 718/105 |
| 2013/0185729 A1* | 7/2013 | Vasic | G06F 9/5072 |
| | | | 718/104 |
| 2013/0238780 A1* | 9/2013 | Devarakonda | G06F 9/5072 |
| | | | 709/224 |
| 2013/0263120 A1* | 10/2013 | Patil | G06F 9/45558 |
| | | | 718/1 |
| 2014/0019966 A1* | 1/2014 | Neuse | G06F 9/45533 |
| | | | 718/1 |
| 2014/0040452 A1* | 2/2014 | Keskkula | H04L 67/1029 |
| | | | 709/224 |
| 2015/0235308 A1* | 8/2015 | Mick | G06Q 30/08 |
| | | | 705/26.3 |

\* cited by examiner

EFFICIENT RESOURCE MANAGEMENT IN A VIRTUALIZED COMPUTING ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to optimizing the placement of virtual machines in a computing environment and, more particularly, to a system and method to increase the efficiency of the management of a virtualized computing environment having a plurality of hosts.

BACKGROUND

In a virtualized computing system, requests for service arrive and are generally analyzed by a placement engine to determine which of the hosts in a cluster of N hosts are better suited in terms of resources and constraints to service a particular request. The placement task can become very complex and lengthy when the number of available hosts N is large, because many factors associated with each host are taken into account to determine which hosts are the most suitable for resource allocation.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, machines, systems and methods for allocating resources to service one or more requests are provided. The method comprises associating with at least one host from among N hosts, in a computing environment, a first value that reflects a probability that servicing a first request will interfere with operations on the host; selecting M hosts out of the N hosts, wherein the N hosts comprise one or more resources for servicing a first request and wherein at least one of the selected M hosts is determined to be at least as suitable as N–M unselected hosts, for the purpose of servicing the first request; and prior to allocation of resources, updating for at least a first host from among the M hosts the corresponding first value to reflect that servicing the first request may interfere with operations pertaining to other previously received requests that are scheduled to be serviced by the first host.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
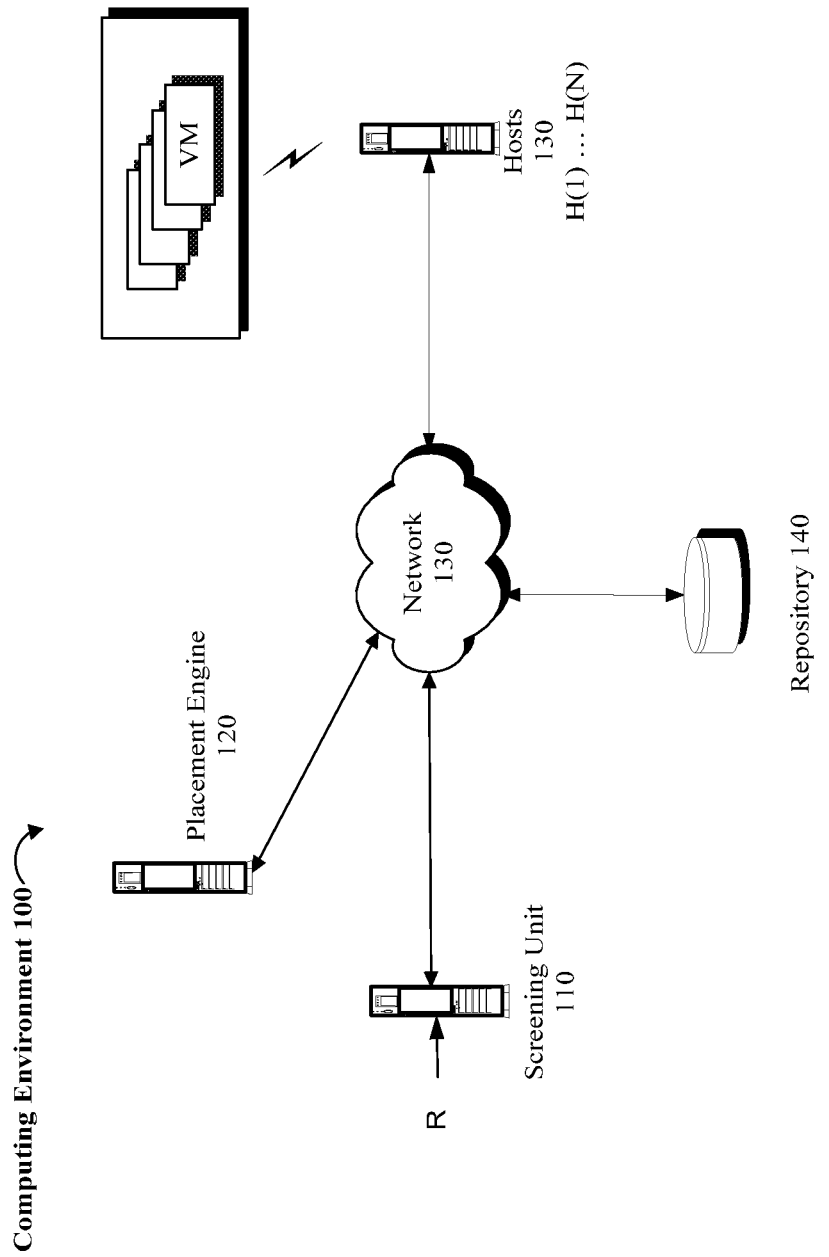
FIG. 1 illustrates an exemplary computing environment in accordance with one or more embodiments, wherein one or more hosts are selected to service one or more requests.

Referring to FIG. 1, the efficiency of the management of a computing environment 100, having a plurality of hosts 130 (i.e., a set of N hosts), may be enhanced by way of filtering the hosts 130 using a screening unit 110 for suitability prior to calculating a placement plan. As provided in more detail below, upon receiving one or more requests "R" for service, screening unit 110 selects a subset M out of the N hosts 130, where the M hosts are determined to be both generally and relatively more suitable than the rest. One of the screening goals is to select M hosts that would increase the concurrency of the execution of multiple placement plans as computed by a placement engine 120.

In accordance with one embodiment, the efficiency of the placement engine 120 may be increased by reducing the workload on the placement engine 120 in a manner such that instead of having to analyze all the variable elements noted above with respect to placement and allocation for a large plurality of N hosts in a cluster, a subset of the hosts (i.e., M hosts out of the total N hosts in the cluster) that are among the most suitable to service the request are selected. The selected M hosts are then presented to the placement engine 120 and the placement engine selects one or more of the M hosts to service the request.

Using the screening results, a placement engine 120 may calculate a placement plan for allocating resource to one or more servicing entities (e.g., virtual machines or VMs) by placing the VMs on one or more hosts 130 that have the resources for servicing the incoming requests. Some of the pertinent factors that are examined by the placement engine 120 may include: the individual or collective hosting resources, the actually used or remaining capacity of each host for handling new allocations, the collocation constraints associated with the hosted VMs, the projected capacity of a host's resources based on currently scheduled requests for that host's resources, and other types of details and constraints associated with the deployment or allocation of virtual resources in a computing environment.

Figure 2:
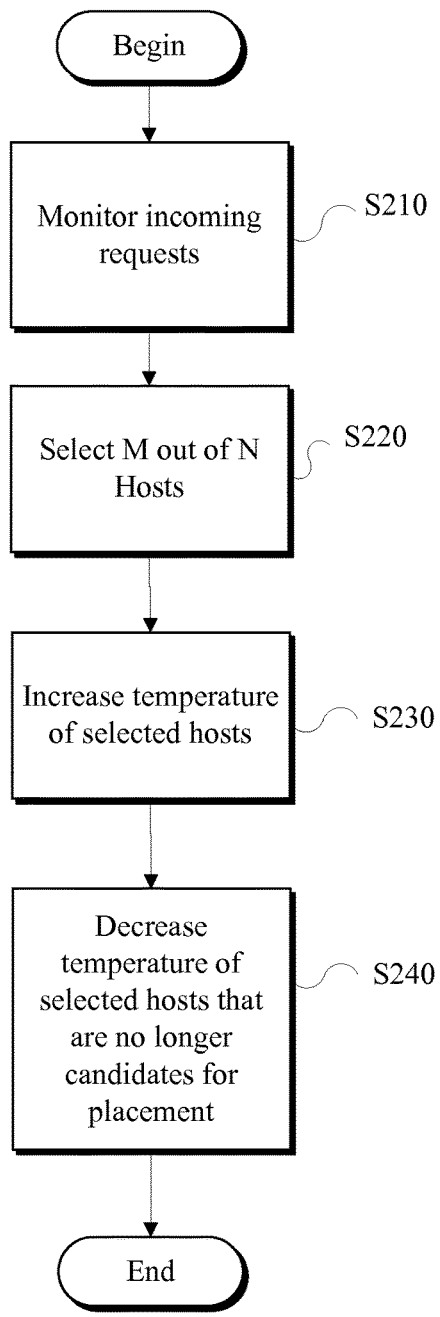
FIG. 2 is a flow diagram of a resource management method in the exemplary computing environment shown in FIG. 1, in accordance with one embodiment.

Referring to FIG. 2, depending on implementation, screening unit 110 may monitor incoming requests (S210) and select M hosts our of N available hosts (S220) based on "general" or "relative" factors that may affect the suitability determination for a host. For example, a host's capacity to host one or more VMs to service a request may be a general factor in determine the suitability of the host. Another general suitability factor may be related to placement contraints (e.g., anti-locations, anti-collocations) that may prevent or encourage the placement of two or more VMs on the same host. Another general suitability factor may relate to whether a host may feasibly support the dynamic allocation of sufficient processor resources to one or more VMs that are to be instantiated to service the incoming requests.

In one embodiment, the general suitability for a host may be determined and tracked based on the standard attributes associated with a host (e.g., the host's total capacity for a target resource needed to service a request, the dynamic levels of resources requested by the various VMs or certain constraints associated with the host's resources, collocation constraints, parallel processing capabilities, compatibility issues, etc.). The generally defined attributes of each host, typically, are not dependent on the concurrently active or prescheduled resource allocation or deployment activities of the host or other hosts.

To determine the suitability of a host, screening unit 110 may also take into account relative suitability factors such as whether potential concurrency constraints limit the speed at which the computed placement plans may be executed. Furthermore, the relative suitability of a host may be determined and tracked based on certain attributes associated with a host, such as the host's available capacity for a target resource needed to service a request, or certain constraints that may change over time depending on the concurrently active or prescheduled resource allocation or deployment activities of the host or other hosts in computing environment 120.

In one implementation, a relative suitability attribute for a host may be defined as an index associated with the probability that operations needed for handling a particular request by a target host may interfere with operations pertaining to other concurrently processed management requests for the same host or other hosts. The relative suitability of a host may be referred to, for the purpose of example and brevity, as the host's temperature. A host temperature may be tracked by assigning a numeric value (e.g., 0) to the host, if allocating one or more resources available on the host does not interfere with the successful or timely operation of other requests that may be already active or pending for that host or another host.

Referring back to FIG. 2, in one example implementation, the respective temperature of a host is increased by a certain degree (e.g., 1), if the host is selected as a possible candidate for servicing a request (S230). In some embodiments with additional levels for tracking details, the temperature associated with one or more resources of a selected host may also rise by a certain degree, depending on whether one or more of the resources available on the host are selected as candidates for servicing a request. Naturally, a host or resource temperature may be lowered or otherwise adjusted if future service expectations are diminished due to reallocation, a change in placement plans or other events.

It is noteworthy that the temperature of a host may be a function of the remaining concurrency level as opposed to the absolute number of operations that are running or pending against a host. For example, consider two hosts: H1 and H2, where H1 is limited to a maximum of four concurrent operations and H2 is limited to a maximum of eight concurrent operations. In this example, assume that two operations are executing or pending against H1 and three against H2.

In the above scenario, the temperature of H1 will be designated as higher than the temperature of H2, because due to its capacity factor H2 is capable of supporting five more operations, whereas H1 is capable of supporting only two additional operations, for example. As noted earlier, the temperature of a host or temperatures or certain resources of a host may be decreased, if the host or one or more of its resources are no longer a candidate for servicing a request or placement (S240).

Referring back to FIG. 1, the associated temperatures (i.e., relative attributes) for the hosts may be tracked and stored in a repository 140 (e.g., a data structure) that may be updated as the temperatures change depending on the allocation and deployment of various resources for each host in the cluster. In addition to the temperatures, repository 140 may also store the general attribute information for each host so that when a request arrives, the information in repository 140 may be used to determine the best allocation strategy.

Advantageously, having access to the information stored in repository 140, when a request arrives, screening unit 110 is able to select M hosts out of the total N hosts 130 that are the most suitable for servicing the request. For example, M hosts may be selected from among M+L hosts with the coolest temperatures in the cluster (i.e., based on the relative suitability attributes of the M+L hosts matching the services required by the request). L of said hosts may be eliminated from the list by the virtue of L of said hosts not being suitable due to, for example, the general attributes for such host not being sufficient to satisfy the required services or resources associated with a request in a meaningful way.

Once the M suitable hosts from a total of N hosts in the cluster are selected by screening unit 110, the temperature associated with those M hosts is increased by a certain value to indicate that using said M hosts for servicing a future request may likely interfere with the servicing of the current request. The M hosts are referred to the placement engine 120. The placement engine 120 then selects one or more of the M hosts to service the request. If less than all the M hosts (e.g., only P hosts) are scheduled or deployed for servicing the request, then the temperature of the hosts (from among the M selected hosts) that are not selected is decreased by a certain value.

As noted earlier, the increase and decrease in the temperature of the hosts is reflected in the data stored in the repository 140 at predetermined intervals or each time an event (e.g., selection as candidate for future deployment or selection for active deployment) takes place. It is noteworthy that, depending on implementation, the tracking of the temperatures may take place either at the host level or at the resource level so that the repository 140 includes the general and relative suitability information for the hosts or the resources for said hosts as provided in further detail in the examples that follow.

In one example scenario, hosts $H_0$, $H_1$, $H_2$, $H_3$, $H_4$ $H_5$ may be in a cluster with host $H_0$ hosting the following VMs: v, w, x. In this scenario, a new request may arrive for a VM z to be deployed on a host in the subject cluster. At the time of arrival of the new request, there may already exist a first computed placement plan which requires v to be relocated to $H_1$ and w to $H_2$. It is assumed in this example that $H_0$ has sufficient capacity to accommodate v and w and z and that $H_0$ can deal with up to two concurrent operations (e.g., relocations or deployments) and that z cannot be placed on host $H_3$ for compatibility reasons.

When the first computed placement plan is submitted for execution, the temperature of $H_0$, $H_1$ and $H_2$ are increased. The screening unit 110 takes the hosts temperatures into account and also the compatibility constraint noted above and therefore will issue a deployment plan for z that will return a target area covering hosts $H_4$, and $H_5$. $H_0$, $H_1$ and $H_2$ are not included in the target area because of their higher temperature and as such the concurrency limitations associated with $H_0$ are taken into account.

Figure 3:
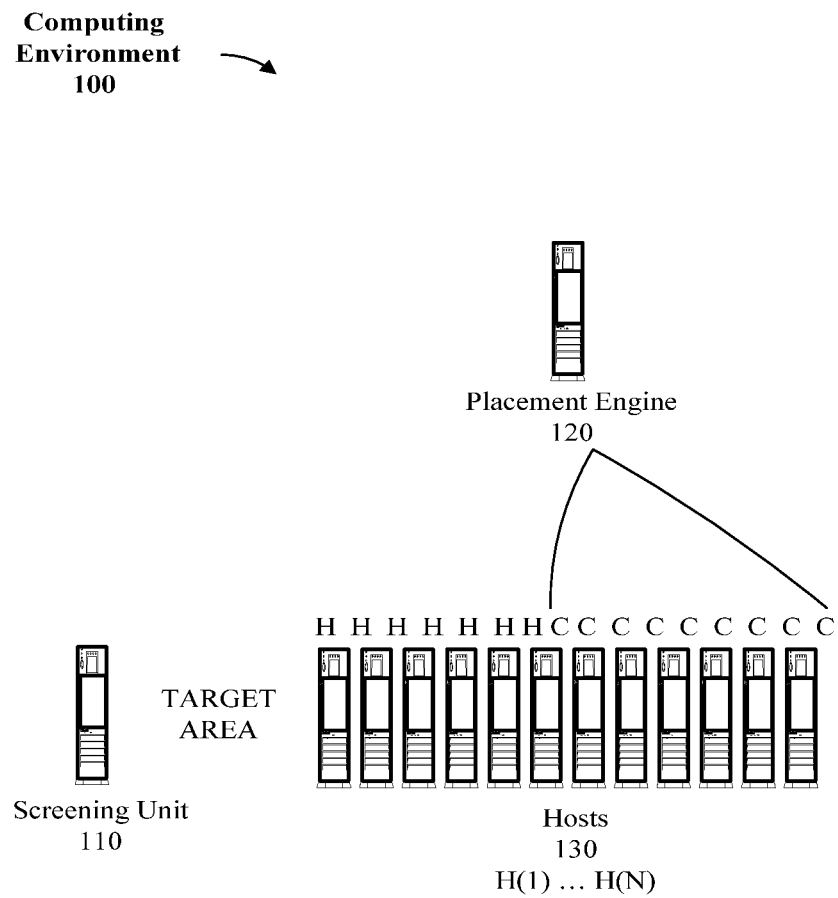
FIG. 3 is an exemplary illustration of selecting one or more host to service a request from a computed target area in a cluster of hosts, in accordance with one embodiment.

Referring to FIG. 3, the flow of the request processing by screening unit 110 may be implemented according to the following exemplary details. Upon receiving a new request, screening unit 110 computes a target area (i.e., a number of suitable hosts 1 to N) based on an estimation of the needed resources to process the request. The computation may be based on information that indicates the hosts' availability and their associated temperature. Said information may not include the details of the VMs placed on each host but may include an iteration number indicating how many times screening unit 110 was invoked for the received request.

Using the above information in addition to placement constraints such as compatibility information, screening unit 110 outputs a proposed target area which has a good chance of supporting the successful processing of the request and produces minimal interference between processing the request and other pending requests. In one implementation, an optional time limit may be considered to instructs the placement engine 120 to limit its search for a solution placement to a given maximum time.

The temperature of the hosts of the computed target area is increased to reflect said hosts may be involved in servicing the request. A placement plan for servicing the request is then computed by the placement engine 120 (possibly concurrently with other plan computations). In one example, the input of the placement engine is the request, the target area, the optional time limit, constraints affecting the placement and other related factors.

The output of the placement engine 120 based on the above example input may be a calculated placement plan to service the request. If no suitable host is found, the output may so advise. Otherwise, if a placement plan is successfully computed then the temperature of the hosts in the target area that would not be involved in the placement is decreased. The temperature of the hosts in the target area that would be involved in the placement, optionally, is further increased, in one embodiment. Ultimately, the computed placement plan is scheduled for execution.

In accordance with one example, screening unit 110 may be utilized to compute the target area by focusing on the coldest hosts in the target area first and optionally taking into account the high level management policy for the placement engine. For instance, if the management policy is to load balance the hosts in a cluster, the screening unit 110 may prefer underloaded hosts in the target areas. On the contrary, if the management policy is to consolidate VMs into a lower number of hosts, the screening unit 110 may prefer to include hosts which are more loaded than the average in the target area.

Depending on implementation, screening unit 110 may output partially overlapping target areas for concurrent requests. In such a scenario, the probability of interference may be kept to a minimum by having the placement engine 120 use the temperature of the hosts as an optimization parameter, so that the probability of a host being chosen to be part of the placement decreases with its temperature, thus minimizing inferences between the target areas. As shown in FIG. 3, for example, placement engine 120 may focus the placement on the coldest hosts first, if possible.

In the embodiments disclosed, the temperature concept may be generalized to other shared resources, as provided earlier. For instance, assuming that multiple local area networks (LANs) may be used for relocations, each LAN may be associated with a temperature indicator which may reflect the degree with which a LAN resource is currently used or about to be used. This may be taken into account by the screening unit 110 and by the placement engine 120 in order to favor the output of placement plans in order to promote balanced usage of the LANs.

Depending on implementation, the screening unit 110 may implement as a backup to handle the failure to compute a placement plan by the placement engine 120, for example. In case of a global optimization request (such as load balancing for instance), a global cluster optimization may not be inherently scalable. Therefore, the global optimization of a hosts cluster may be optimized by way of breaking down the optimization task into frequent subtasks, instead of optimizing the full cluster infrequently.

In the above example, the subtasks may each deal with a subset of the cluster. Each such subtask may favor the coldest hosts, and hosts which have not participated for the longest time in an optimization, for example. Optionally, the target area for the next optimization may be selected to intersect with the target area of previous optimizations to maintain the continuity of the optimization goal.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
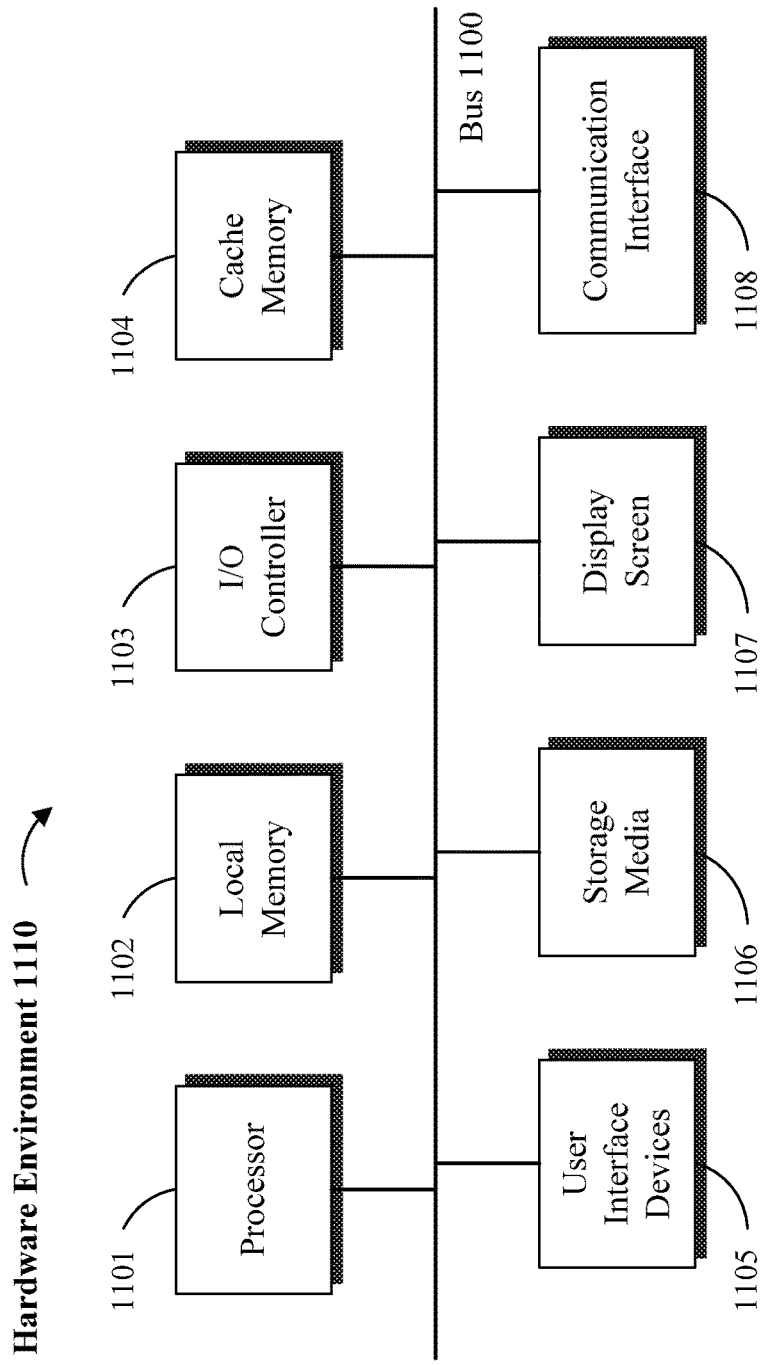
FIGS. 4A and 4B are block diagrams of hardware and software environments in which the disclosed systems and methods may operate, in accordance with one or more embodiments.
Figure 4B:
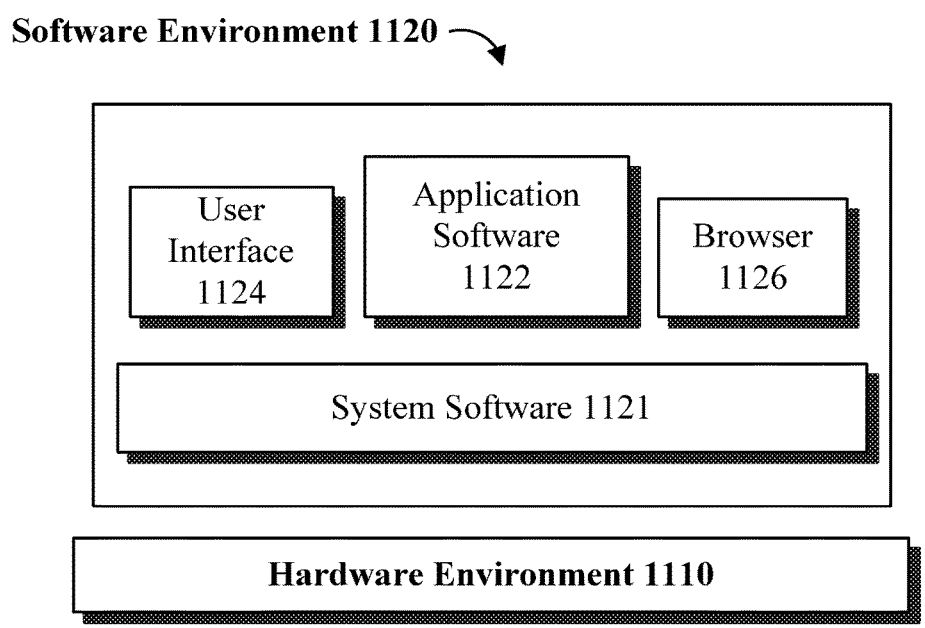

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for allocating resources to service one or more requests, the method comprising:
    associating, with at least two hosts from among a set of N hosts, in a computing environment, a set of suitability values that reflects a probability that servicing a first request will interfere with operations on the host;

selecting, based on the suitability values, a subset of M hosts out of the set of N hosts, wherein the set of N hosts comprises one or more resources for servicing a first request and wherein at least one of the selected subset of M hosts is determined, based on the suitability value for that at least one of the selected M hosts, to be at least as suitable as N−M unselected hosts in the computing environment, for the purpose of servicing the first request, and wherein the selecting is based at least on the amount of time since at least one of the M hosts has serviced a prior request;

prior to allocation of resources, updating for at least a first host from among the subset of M hosts the corresponding suitability value to reflect that servicing the first request may interfere with operations pertaining to other previously received requests that are scheduled to be serviced by the first host;

selecting one or more resources of a subset of L hosts from among said subset of M hosts for the purpose of servicing the first request, where said selecting results in allocation of said one or more resources of the subset of L hosts, while resources of remaining M−L hosts from among said subset of M hosts remain unallocated for the purpose of servicing the first request; and updating the suitability values associated with the M−L hosts from which no resources were selected for the purpose of servicing the first request;

wherein the processor is instructed to limit the selecting M hosts to within a given maximum time.

2. The method of claim 1 wherein updating the suitability values associated with the M−L hosts indicates that servicing the first request no longer has a higher probability of interfering with the operations pertaining to other previously received requests that are scheduled to be serviced by one or more of the M−L hosts, since resources of the M−L hosts were not selected for the purpose of servicing the first request.

3. The method of claim 2, wherein in response to receiving a second request to be serviced, the set of N hosts are evaluated with respect to the corresponding suitability values associated with each host in the said set of N hosts to determine which of the hosts has a lower probability of interfering with operations pertaining to other previously received requests that are scheduled to be serviced by one or more of the set of N hosts.

4. The method of claim 3, wherein from among the set of N hosts, one or more hosts, determined to have a lower probability of interfering with operations pertaining to other previously received requests, are selected over hosts with a higher probability of interfering with operations pertaining to other previously received requests.

5. The method of claim 1 wherein the selected subset of M hosts have a higher probability of having sufficient level of resources available in comparison to the N−M hosts, for the purpose of servicing the first request.

6. The method of claim 1, wherein a screening unit performs the selecting of the subset of M hosts, prior to a processor allocating one or more resources of the subset of M hosts for the purpose of servicing the first request.

7. The method of claim 6 wherein the screening unit performs the selecting based on factors related to suitability of a host for servicing the first request without interfering with the host's prior commitments for servicing other requests.

8. The method of claim 6 wherein the processor performs the resource allocation based on factors related to at least one of individual or collective hosting resources for said subset of M hosts, actually used or remaining capacity of each host for handling new allocations available for said subset of M hosts, or collocation constraints associated with one or more resources deployed on the subset of M hosts for the purpose of servicing the first request.

9. A system for allocating resources to service one or more requests, the system comprising:
a processor; and
a memory in communication with the processor, the memory containing program instructions that, when executed by the processor, are configured to cause the processor to perform a method, the method comprising:
associating, with at least two hosts from among a set of N hosts, in a computing environment, a set of suitability values that reflects a probability that servicing a first request will interfere with operations on the host;
selecting, based on the suitability values, a subset of M hosts out of the set of N hosts, wherein the set of N hosts comprises one or more resources for servicing a first request and wherein at least one of the selected subset of M hosts is determined, based on the suitability value for that at least one of the selected M hosts, to be at least as suitable as N−M unselected hosts in the computing environment, for the purpose of servicing the first request, and wherein the selecting is based at least on the amount of time since at least one of the M hosts has serviced a prior request; and
updating for at least a first host from among the M hosts the corresponding suitability value to reflect that servicing the first request may interfere with operations pertaining to other previously received requests that are scheduled to be serviced by the first host;
wherein the processor is instructed to limit the selecting M hosts to within a given maximum time.

10. The system of claim 9 further comprising selecting one or more resources of a subset of L hosts from among said subset of M hosts for the purpose of servicing the first request, where said selecting results in allocation of said one or more resources of the subset of L hosts, while resources of remaining M−L hosts from among said subset of M hosts remain unallocated for the purpose of servicing the first request.

11. The system of claim 10 further comprising updating the suitability values associated with the M−L hosts from which no resources were selected for the purpose of servicing the first request.

12. The system of claim 11 wherein updating the suitability values associated with the M−L hosts indicates that servicing the first request no longer has a higher probability of interfering with the operations pertaining to other previously received requests that are scheduled to be serviced by one or more of the M−L hosts, since resources of the M−L hosts were not selected for the purpose of servicing the first request.

13. The system of claim 12, wherein in response to receiving a second request to be serviced, the set of N hosts are evaluated with respect to the corresponding suitability values associated with each host in said set of N hosts to determine which of the hosts has a lower probability of interfering with operations pertaining to other previously received requests that are scheduled to be serviced by one or more of the set of N hosts.

14. A computer program product for allocating resources to a service including one or more requests comprising a computer readable storage medium having a computer readable program stored therein, wherein the computer readable program, when executed on a computer causes the computer to:
- associate with at least two hosts from among a set of N hosts, in a computing environment, a set of suitability values that reflects a probability that servicing a first request will interfere with operations on the host;
- select, based on the suitability values, a subset of M hosts out of the set of N hosts, wherein the set of N hosts comprises one or more resources for servicing a first request and wherein at least one of the selected subset of M hosts is determined, based on the suitability value for that at least one of the selected M hosts, to be at least as suitable as N−M unselected hosts in the computing environment, for the purpose of servicing the first request, and wherein the selecting is based at least on the amount of time since at least one of the M hosts has serviced a prior request; and
- prior to allocation of resources, update for at least a first host from among the subset of M hosts the corresponding suitability value to reflect that servicing the first request may interfere with operations pertaining to other previously received requests that are scheduled to be serviced by the first host;
- wherein the processor is instructed to limit the selecting M hosts to within a given maximum time and wherein the computer readable storage medium is not transitory per se.

15. The computer program product of claim 14 further comprising selecting one or more resources of a subset of L hosts from among said subset of M hosts for the purpose of servicing the first request, where said selecting results in allocation of said one or more resources of the subset of L hosts, while resources of remaining M−L hosts from among said subset of M hosts remain unallocated for the purpose of servicing the first request.

16. The computer program product of claim 15 further comprising updating the suitability values associated with the M−L hosts from which no resources were selected for the purpose of servicing the first request.

17. The computer program product of claim 16 wherein updating the suitability values associated with the M−L hosts indicates that servicing the first request no longer has a higher probability of interfering with the operations pertaining to other previously received requests that are scheduled to be serviced by one or more of the M−L hosts, since resources of the M−L hosts were not selected for the purpose of servicing the first request.

18. The computer program product of claim 17, wherein in response to receiving a second request to be serviced, the set N hosts are evaluated with respect to the corresponding suitability values associated with each host in said set of N hosts to determine which of the hosts has a lower probability of interfering with operations pertaining to other previously received requests that are scheduled to be serviced by one or more of the set of N hosts.

* * * * *